(12) United States Patent
Ghodbane et al.

(10) Patent No.: US 6,748,761 B2
(45) Date of Patent: Jun. 15, 2004

(54) HVAC SYSTEM WITH EVAPORATOR WARMING

(75) Inventors: Mahmoud Ghodbane, Lockport, NY (US); James Allen Baker, Williamsville, NY (US); Prasad Shripad Kadle, East Amherst, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/457,732

(22) Filed: Jun. 9, 2003

(65) Prior Publication Data

US 2004/0003623 A1 Jan. 8, 2004

Related U.S. Application Data

(60) Provisional application No. 60/393,271, filed on Jul. 2, 2002.

(51) Int. Cl.⁷ .......................... F25D 17/04; F25D 17/06

(52) U.S. Cl. .............................................. 62/408; 62/89

(58) Field of Search ........................... 62/408, 89, 498, 62/407

(56) References Cited

U.S. PATENT DOCUMENTS 6,224,480 B1 * 5/2001 Le et al. ..................... 454/160

* cited by examiner

*Primary Examiner*—Chen Wen Jiang
(74) *Attorney, Agent, or Firm*—Patrick M. Griffin

(57) ABSTRACT

An air conditioning system for a vehicle includes an evaporator for evaporating the refrigerant and including a predetermined portion in which refrigerant pools. A device for directing the flow of air to the predetermined portion to minimize the pooling of refrigerant in the predetermined portion includes a spool and a sheet wound around the spool for winding and unwinding the sheet. The opening is disposed in the sheet for allowing airflow to said predetermined portion of the evaporator.

9 Claims, 2 Drawing Sheets

HVAC SYSTEM WITH EVAPORATOR WARMING

RELATED APPLICATION

This application claims the priority of provisional application No. 60/393,271 filed Jul. 2, 2002.

FIELD OF THE INVENTION

The subject invention relates to an air conditioning system for a vehicle, frequently referred to as a heating, ventilating and air conditioning (HVAC) system.

BACKGROUND OF THE INVENTION

Such systems typically include a compressor for compressing a refrigerant, a condenser for condensing the refrigerant, an evaporator for evaporating the refrigerant, a discharge fluid line interconnecting the compressor and the condenser, a liquid fluid line interconnecting the evaporator and the condenser, and a suction fluid line interconnecting the evaporator and the compressor. Also, such systems utilize various valve arrangements for controlling flow through the system during operation and during shutdown and/or in response to a leak of refrigerant in the system. In addition, an accumulator/dehydrator is frequently disposed in the suction line for accumulating refrigerant, or a receiver/drier disposed in the liquid line for storing refrigerant.

Past experience and recent studies demonstrate that at low load conditions, when the variable displacement compressor is operating at part stroke, refrigerant is trapped in the low side of the system, particularly in the evaporator. Minimizing this resident refrigerant will allow the system to be ready for any unforeseen events. One of the ways of minimizing this resident refrigerant is to minimize the internal volume of the evaporator. This entails proper design of the evaporator for low flow conditions. Another key factor in this design is to have very little volume at the bottom of the evaporator. This is particularly true of the U-channel evaporator that has tanks only on one side. These tanks are located at the top of the evaporator preventing any pooling of liquid refrigerant at the bottom of the evaporator.

Despite the efforts of minimization of charge resident in the evaporator, under certain conditions with a variable compressor, some refrigerant that is not actively participating in the heat transfer process stays resident in the evaporator. The reason for this is that the system has excess refrigerant to handle transient conditions and loss of charge over time. At low loads, the compressor de-strokes to match the needs of the system. Thus, the pumping capacity is reduced and the velocities of the refrigerant fall within the system. If the velocity is not high enough within the evaporator to overcome the gravitational effect, the liquid refrigerant tends to pool at the bottom. This is especially true of evaporators that have tanks at the bottom. This liquid refrigerant pooled in the evaporator has no "pull" from either the compressor or the evaporation process because of system low loads and thus stays resident in the evaporator, pull being the natural migration of refrigerant to the coolest areas of the system. Accordingly, there is a constant need for methods to minimize the pooling of refrigerant in the evaporator.

SUMMARY OF THE INVENTION AND ADVANTAGES

The subject invention relates to directing air to a predetermined portion of the evaporator to accelerate evaporation and hence minimize the pooling of refrigerant in the evaporator.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
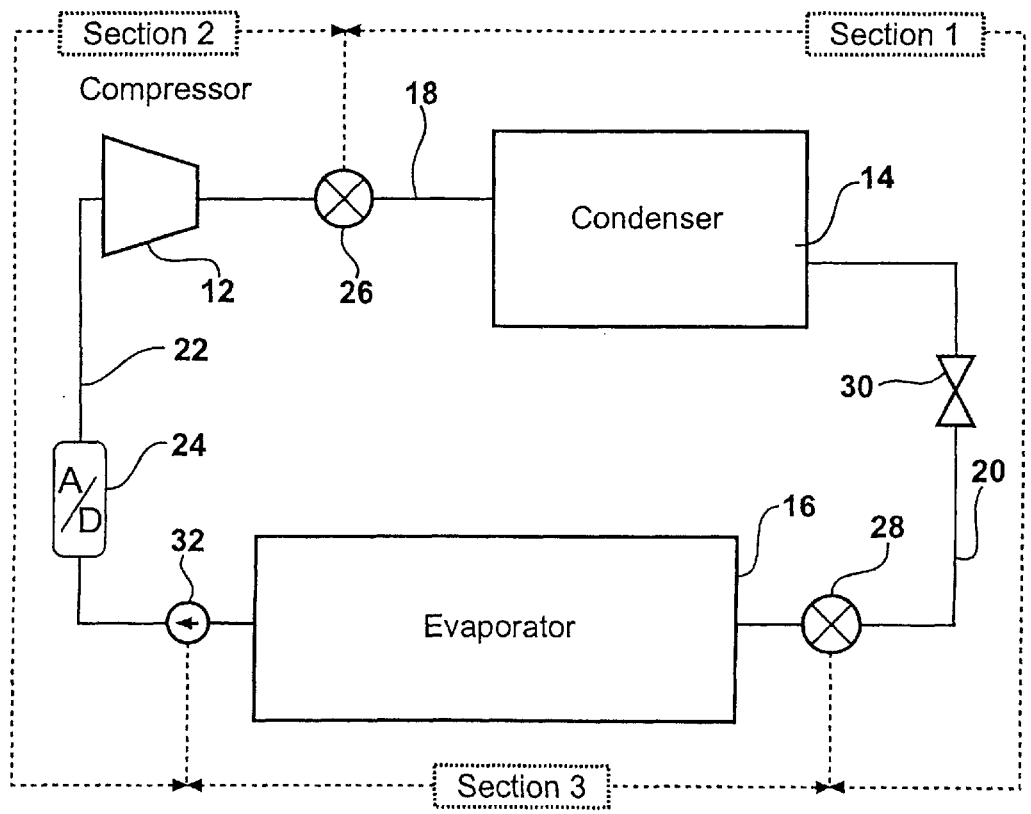
FIG. 1 is a schematic view of an air conditioning system employing the subject invention.

As alluded to above the subject invention relates to an air conditioning system for a vehicle that comprises a compressor 12 for compressing a 20 refrigerant, a condenser 14 for condensing the refrigerant, and an evaporator 16 for evaporating the refrigerant. Of course, a discharge fluid line 18 interconnects the compressor 12 and the condenser 14, while a liquid fluid line 20 interconnects the condenser 14 and the evaporator 16, and a suction fluid line 22 interconnects the evaporator 16 and the compressor 12.

As is well known in the art, an accumulator/dehydrator (A/D) 24 is disposed in the suction fluid line 22 for accumulating refrigerant.

In addition, various valves are included for controlling the flow of refrigerant through the system. A first solenoid-operated valve 26 is moved between open and closed positions to control fluid flow in the suction fluid line 18 between the compressor 12 and the condenser 14. A second solenoid-operated valve 28 is moved between open and closed positions to control fluid flow in the liquid fluid line 20 between the condenser 14 and the evaporator 16. A thermal expansion device 30 is also disposed in the liquid fluid line 20 between the condenser 14 and the evaporator 16. A check valve 32 is disposed in the suction fluid line 22 between the evaporator 16 and the accumulator/dehydrator (A/D) 24. In this configuration, the expansion device is normally an orifice tube but generally could be replaced by any expansion device such as a capillary tube, TXV, etc.

These valves divide the system into three sections with section one extending between the first 26 and second 28 solenoid valves, section two extending between the check valve 32 and the first solenoid valve 26, and section three extending between the valves on either side of the evaporator 16, i.e., the second solenoid valve 28 and the check valve 32. Accordingly, section three consists primarily of the evaporator 16. This section three serves to isolate the evaporator 16 in the "off" mode. In general, the vehicle sits idle for very long periods of time. In case of a leak out of the evaporator 16, this minimal charge will be released into the passenger compartment but will not pose any safety hazard because of the low internal volume of section three. The check valve 32 is provided to allow the flow of refrigerant out of the evaporator 16 and into the A/D 24 when the system is shut down. The A/D 24 has high internal volume and typically holds the reserve charge in the system. This reserve charge allows the system to operate without any loss of performance in transient situations. The A/D 24 would be strategically placed such that its integrity would not be breached in most collisions (typically between the engine and the dash). The system is separated into several sections to mitigate the leaks out of the system in a collision or a leak caused by corrosion, etc.

Figure 2:
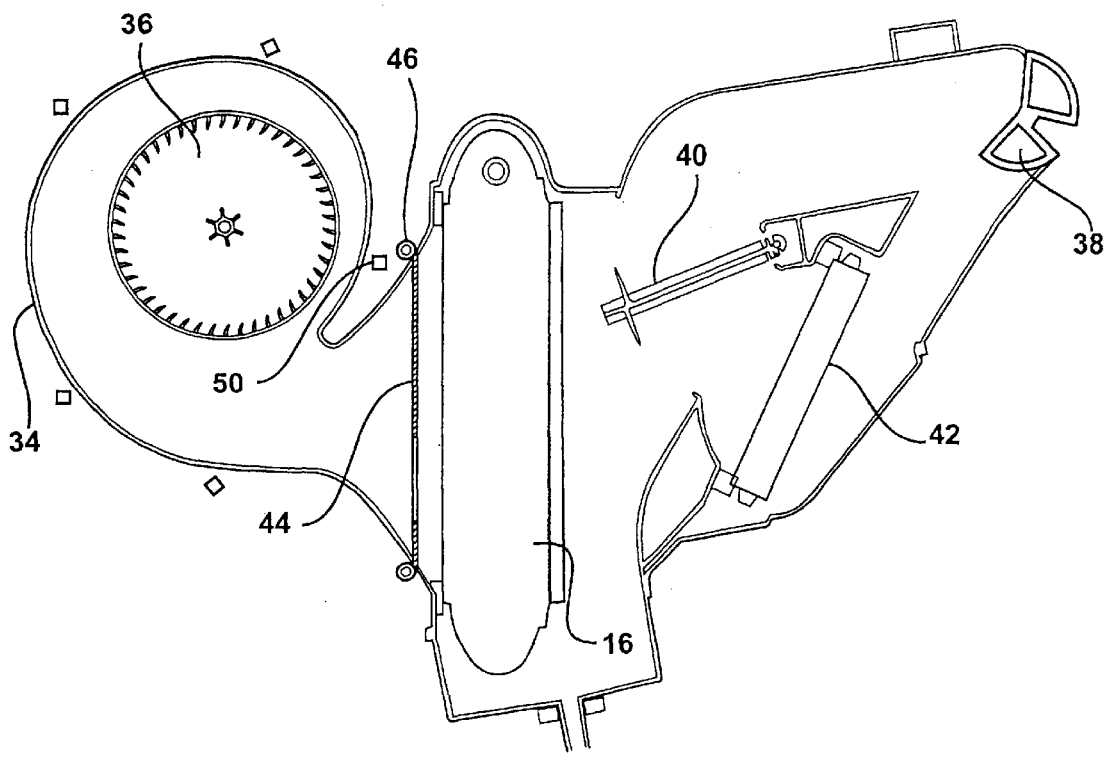
FIG. 2 is a cross sectional view of a HVAC module having a film valve to implement the subject invention.

An HVAC module is illustrated in FIG. 2 and besides the evaporator 16 includes a housing or casing 34 surrounding a blower 36 for directing air through the evaporator 16 and out of a vent control 38 for circulation in the passenger compartment. A door or valve 40 directs air through the heater 42 or directly to the vent 38. The evaporator 16 has a predetermined portion in which refrigerant pools and the subject invention provides a device for directing the flow of air to that predetermined portion of the evaporator 16 to minimize the pooling of refrigerant in that predetermined portion.

Figure 3:
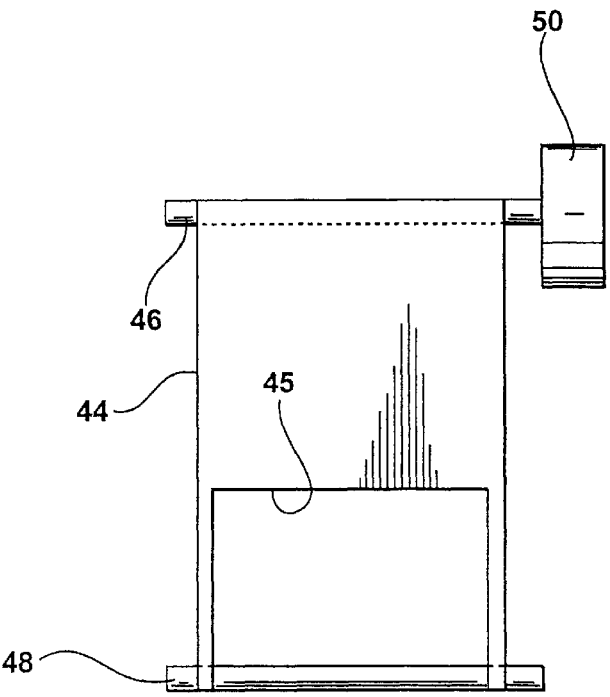
FIG. 3 is a frontal view of film valve shown in FIG. 2.

The pooling of refrigerant is mitigated by directing the air from the outside (in fresh air or outside air mode) or from the inside (in re-circulation mode) to a predetermined portion of the evaporator 16 where liquid collects, i.e., pools. As shown in FIGS. 2 and 3, the evaporator 16 is a two opposite tank evaporator 16 with one tank at the bottom. In this case, directing air to the lower side of the evaporator 16 can minimize liquid pooling in the bottom tank by accelerating refrigerant evaporation.

The device illustrated utilizes a film valve technology. The device includes a film valve 44 to block airflow to the evaporator 16 and an opening 45 therethrough for allowing airflow to that predetermined portion of the evaporator 16.

This is a screen that scrolls up and down and blocks off airflow in certain regions. In this case, the lower half of the screen will have a large opening and as it scrolls down the upper portion is blocked off and the lower portion is exposed because of the opening. The film valve 44 comprises a spool 46 and a sheet wound around the spool 46 for winding and unwinding the sheet, the opening 45 being disposed in the sheet. FIG. 3 shows the configuration of the screen in the rolled down position. Under high load conditions this screen will roll up exposing the full face of the evaporator. A similar effect could be achieved for evaporation with no bottom tank (e.g., U-channel), in which liquid trapped in the tubes would be evaporated by the increased and directed airflow.

The sheet has a free end with a stay 48 disposed at the free end. The stay could be disposed in a loop at the bottom of the sheet, much like the stay in the bottom edge of a widow shade. The opening 45 is disposed in the sheet adjacent the free end. An electrically operated actuator 50 is included for winding and unwinding the sheet on the spool 46.

Accordingly, the subject invention provides a method of operating an air conditioning system of the type including an evaporator 16 for evaporating the refrigerant and including a predetermined portion in which refrigerant pools by directing the flow of air to the predetermined portion to minimize the pooling of refrigerant in the predetermined portion. This is accomplished in a specific form by blocking airflow to the evaporator 16 with a sheet of material and allowing airflow to the predetermined portion of the evaporator 16 through an opening 45.

Obviously, many modifications and variations of the present invention are possible in light of the above teachings. The invention may be practiced otherwise than as specifically described within the scope of the appended claims.

What is claimed is:

1. An air conditioning system for a vehicle comprising:

a compressor for compressing a refrigerant, a condenser for condensing the refrigerant, an evaporator for evaporating the refrigerant and including a predetermined portion in which refrigerant pools, a discharge fluid line interconnecting the compressor and said condenser, a liquid fluid line interconnecting said condenser and said evaporator, a suction fluid line interconnecting said evaporator and said compressor, and a device for directing the flow of air to said predetermined portion to minimize the pooling of refrigerant in said predetermined portion.

2. A system as set forth in claim 1 wherein said device includes a film valve to block air flow to said evaporator and an opening therethrough for allowing air flow to said predetermined portion of said evaporator.

3. A system as set forth in claim 2 wherein said film valve comprises a spool and a sheet wound around said spool for winding and unwinding said sheet, said opening being disposed in said sheet.

4. A system as set forth in claim 3 wherein said sheet has a free end with a stay disposed at said free end.

5. A system as set forth in claim 4 wherein said opening is disposed in said sheet adjacent said free end.

6. A system as set forth in claim 5 including an actuator for winding and unwinding said sheet on said spool.

7. A method of operating an air conditioning system of the type including a compressor for compressing a refrigerant, a condenser for condensing the refrigerant, an evaporator for evaporating the refrigerant and including a predetermined portion in which refrigerant pools, a discharge fluid line interconnecting the compressor and the condenser, a liquid fluid line interconnecting the condenser and the evaporator, a suction fluid line interconnecting the evaporator and the compressor, and an accumulator/dehydrator (A/D) disposed in the suction fluid line for accumulating refrigerant, said method comprising the steps of directing the flow of air to the predetermined portion to minimize the pooling of refrigerant in the predetermined portion.

8. A method as set forth in claim 7 further defined as blocking air flow to the evaporator and allowing air flow to the predetermined portion of the evaporator.

9. A method as set forth in claim 7 further defined as blocking airflow to the evaporator with a sheet of material and allowing air flow to the predetermined portion of the evaporator through an opening.

* * * * *